(12) United States Patent
Jones et al.

(10) Patent No.: US 6,460,105 B1
(45) Date of Patent: Oct. 1, 2002

(54) METHOD AND SYSTEM FOR TRANSMITTING INTERRUPTS FROM A PERIPHERAL DEVICE TO ANOTHER DEVICE IN A COMPUTER SYSTEM

(75) Inventors: Andrew Michael Jones, Bristol (GB); Andrew Keith Betts, Gieres (FR); Glenn Ashley Farrall, Bristol (GB); Brian Foster, Dublin (IE); Andrew Craig Sturges, Bath (GB)

(73) Assignee: STMicroelectronics Limited, Almondsbury Bristol (GB)

(*) Notice: Subject to any disclaimer, the term of this patent is extended or adjusted under 35 U.S.C. 154(b) by 0 days.

(21) Appl. No.: 09/302,685

(22) Filed: Apr. 29, 1999

(30) Foreign Application Priority Data

Apr. 29, 1998 (GB) ............................................. 9809186

(51) Int. Cl.[7] ............................................. G06F 13/24
(52) U.S. Cl. ...................................... 710/268; 710/260
(58) Field of Search ................................. 710/260–269

(56) References Cited

U.S. PATENT DOCUMENTS

| | | | | |
|---|---|---|---|---|
| 5,195,089 A | * | 3/1993 | Sindhu et al. | 370/235 |
| 5,283,904 A | | 2/1994 | Carson et al. | 395/724 |
| 5,495,615 A | | 2/1996 | Nizar et al. | 395/733 |
| 5,634,069 A | * | 5/1997 | Hicok et al. | 710/33 |
| 5,675,807 A | * | 10/1997 | Iswandhi et al. | 710/260 |
| 5,740,452 A | * | 4/1998 | Story et al. | 710/261 |
| 5,978,870 A | * | 11/1999 | Warren | 710/71 |
| 6,018,782 A | * | 1/2000 | Hartmann | 710/129 |
| 6,092,229 A | * | 7/2000 | Boyle et al. | 714/748 |
| 6,170,025 B1 | * | 1/2001 | Drottar et al. | 710/48 |
| 6,295,573 B1 | | 9/2001 | Bailey et al. | 710/260 |

FOREIGN PATENT DOCUMENTS

| | | | |
|---|---|---|---|
| EP | 0 644 489 A2 | 3/1995 | G06F/9/46 |
| GB | 2 298 503 A | 6/1995 | G06F/9/46 |
| WO | WO 9516965 | 6/1995 | G06F/13/00 |

OTHER PUBLICATIONS

British Search Report from Application No. 9809186.1, filed Apr. 29, 1998.

* cited by examiner

*Primary Examiner*—Sumati Lefkowitz
(74) *Attorney, Agent, or Firm*—Wolf, Greenfield & Sacks, P.C.; James H. Morris; Robert A. Skrivanek, Jr.

(57) ABSTRACT

The transmission of interrupts is described where the interrupt is represented at a peripheral device by the electrical level of a conductor but where it is conveyed to a receiving module by way of a message packet routed along a routing path. According to one aspect, the message packet includes the identification of the peripheral device which generated the interrupt and the receiving module acts on the message packet to implement an interrupt handling routine depending on the identification of the peripheral device. According to another aspect, the message packet includes a transaction identifier which uniquely identifies one of a series of interrupts, and the receiving module generates a response packet containing that transaction identifier thereby allowing the peripheral device to monitor whether or not its interrupts have been treated properly.

14 Claims, 6 Drawing Sheets

METHOD AND SYSTEM FOR TRANSMITTING INTERRUPTS FROM A PERIPHERAL DEVICE TO ANOTHER DEVICE IN A COMPUTER SYSTEM

FIELD OF THE INVENTION

The present invention concerns a computer system and method of communication of interrupts in the computer system.

BACKGROUND TO THE INVENTION

In many applications there are more devices which may need interrupt capability than the processor has dedicated interrupt connections. In this case the interrupt request lines of each device may be OR-ed together and connected to a single interrupt pin belonging to the processor. When any one or more of the devices asserts an interrupt the processor interrupt line is asserted. The processor has the task of polling each device in turn. It normally does this by testing the interrupt bit of a status register of each device controller. When the identity of the interrupting device is determined, the processor can then call a routine associated with that interrupt source. This method is appropriate for slower devices or when there are few interrupting devices attached to the system.

Another existing system is generally called a vectored interrupt system. In such a system a separate device sometimes called a programmable interrupt controller (PIC) is connected to all devices which are capable of raising an interrupt. The PIC can be programmed to prioritise any interrupts it receives with respect to each other and, in some cases, with respect to the current priority of the processor. It can also contain a table which contains the association of interrupt handler routines and the interrupt source. In such a system a CPU is directed towards the routine by the PIC.

Another known interrupt system is referred to as a multi-processor interrupt system. In this example, an external device can be configured to provide vectored interrupts to multiple processors. A particular interrupt is associated with a vector and a CPU to which the interrupt request should be sent.

In the first prior art example the interrupt response can be very slow due to the fact that the processor may have to access many device registers before finding out the identity of the interrupt source. This can be slow and does not provide a mechanism for dealing with multiple processors.

The second example cannot be applied to multiple processors and multiple devices.

The third example requires the implementation of an auxiliary bus to carry interrupt signals to multiple processors. This requires extra pins or signals and extra logic to implement whatever protocol applies to the use of these signals.

Interrupts generally occur as a result of a change in state of a peripheral device, caused by some activities of the peripheral device. This change in state is generally represented by an electrical condition, such as the voltage or current level on an output wire. In the prior art, the pins and signal lines carry these state changes to whatever is responsible for dealing with the interrupts. Thus, even in the situation where there is a centralised programmable interrupt controller, there must still be dedicated lines from each peripheral device carrying the state information directly to the central controller. It is one aim of the present invention to remove this requirement for dedicated interrupt lines.

SUMMARY OF THE INVENTION

According to one aspect of the present invention there is provided a method of transmitting an interrupt represented by an electrical level of a conductor from a peripheral device to a receiving module by:
  detecting the electrical level of the conductor;
  constructing a message packet to transmit the interrupt when it is detected that the electrical level has changed between a logical zero level and a logical one level;
  transmitting the message packet from the peripheral device to the receiving module; and
  at the receiving module, handling the message packet to act on the interrupt by implementing an interrupt handling routine.

According to another aspect, the invention also provides computer system comprising at least one peripheral device and a processor in communication with the peripheral device via a routing path, wherein the peripheral device is associated with circuitry for detecting the electrical level of a conductor representing an interrupt and a packet assembler for constructing a message packet when it is detected that the electrical level of the conductor has changed between a logical zero level and a logical one level, wherein the message packet is transmitted from the peripheral device to the processor via the routing path, and wherein the processor includes a packet handler for handling the message packet to act on the interrupt by implementing an interrupt handling routine.

In one embodiment of the invention interrupts are communicated between a number of different peripheral devices and processors in a computer system using discrete event packets. A device wanting to raise an interrupt fabricates an event packet which specifies the processor which is to service the interrupt, and an indication of the origin of the interrupt. This packet is routed to the specified processor. The receiving processor is able to call the interrupt handling routine corresponding to that interrupt either directly or indirectly through a table in a conventional manner. The event packets can carry indications of the interrupt being edge-triggered or level sensitive.

Unlike the prior art, no extra connectivity is required between peripheral devices and any of the processors which can service interrupts.

In one arrangement, the message packet includes identification of the peripheral device which generated the interrupt and the receiving module includes an interrupt handling routine dependent on that identity.

In another arrangement, the message packet includes a transaction identifier which uniquely identifies one of a series of interrupts and the receiving module generates a response packet including the same transaction identifier.

For a better understanding of the present invention and to show how the same may be carried into effect, reference will now be made by way of example to the accompanying drawings.

DESCRIPTION OF THE PREFERRED EMBODIMENT

According to the presently described embodiment, when a peripheral device wishes to raise an interrupt, it constructs and transmits an event packet. This is referred to as generating an event. The following describes how this can be implemented in an embodiment of the invention.

Figure 1:
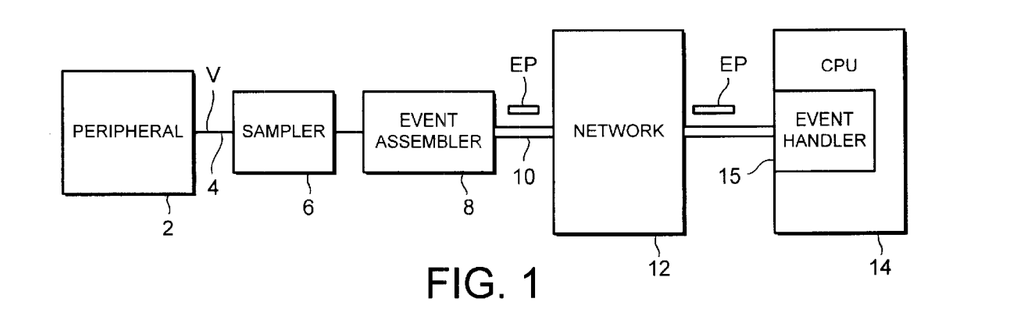
FIG. 1 is a block diagram illustrating the fundamentals of the present invention.

FIG. 1 is a block diagram illustrating the basic fundamentals. A peripheral device 2 has a conductor 4, for example in the form of an interrupt pin or wire which carries state information representative of the activity of the peripheral device 2. That state information takes the form of a logic value V represented by the voltage or current level on the wire 4. That state information is sampled by a sampler 6 which takes the form a transition detector and is described in more detail later. Dependent on the results of the activities of the sampler 6, an event assembler 8 assembles an event packet EP which is dispatched from the event assembler 8 on a routing path 10. That routing path 10 can convey the event packet directly or via a network 12 to a CPU 14. An event handler within the CPU 14 receives the event packet EP and acts on it in an interrupt-like fashion as described in more detail in the following.

Figure 2:
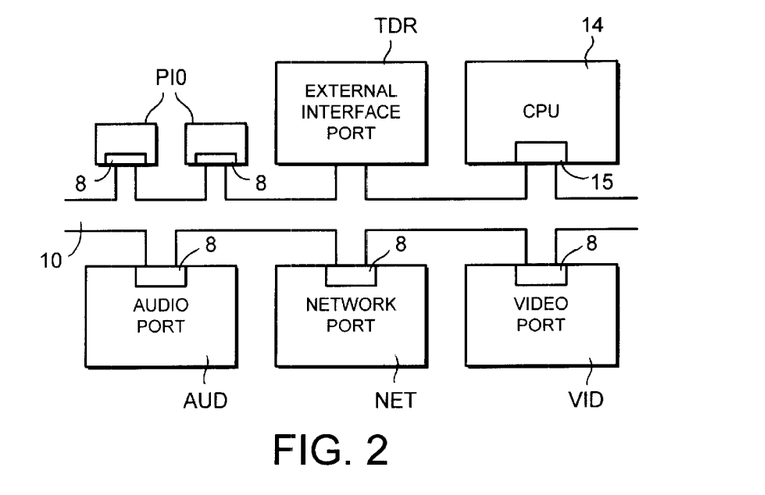
FIG. 2 is one example of a single chip architecture.

A plurality of different peripheral devices or interrupt sources can be provided. FIG. 2 illustrates one example of a single chip architecture which has a routing path 10 to which are connected a plurality of different ports, including an external interface port TDR for providing a debug link from a host to the on-chip CPU 14, two interrupt pins PIO provided at the chip boundary, an audio port AUD, a network port NET and a video port VID. Table I summarises for the particular example ports that generate level-sensitive events and those that can be programmed to generate level-sensitive events or edge events. Level-sensitive events and edge events are discussed in more detail hereinafter. Each port is equipped with an event assembler 8 to allow it to generate events packets EP.

TABLE I

| Module | Interrupt Cause | Number of Distinct Interrupt Sources | Level or Edge |
|---|---|---|---|
| CPU | Interrupt caused by real-time counter | 1 | Level |
|  | Interrupt caused by execution of event instruction | Arbitrary | Programmable |
| TDR | Interrupt caused by debug link Event request from host | Arbitrary | Programmable |
| PIO | Interrupt caused by a pin in PORT D | 12 | Programmable |
|  | Interrupt caused by a pin in PORT E | 8 | Programmable |
| AUD | Interrupt caused by audio port (3 different reasons supported) | 1 | Level |
| NET | Interrupt caused by network port (8 different reasons supported) | 1 | Level |
| VID | Interrupt caused by video port (4 different reasons supported) | 1 | Level |

There are a plurality of valid interrupt destinations. However, as a CPU is the normal destination for interrupts, this is assumed in the following description. However, it is noted that interrupts can also be sent to other modules which are equipped with event handlers.

Event Packet Generation

The state of the interrupt wire 4 can change for a variety of different reasons. Each peripheral device 2 can be considered as an interrupt source of the type illustrated logically in FIG. 3.

Figure 3:
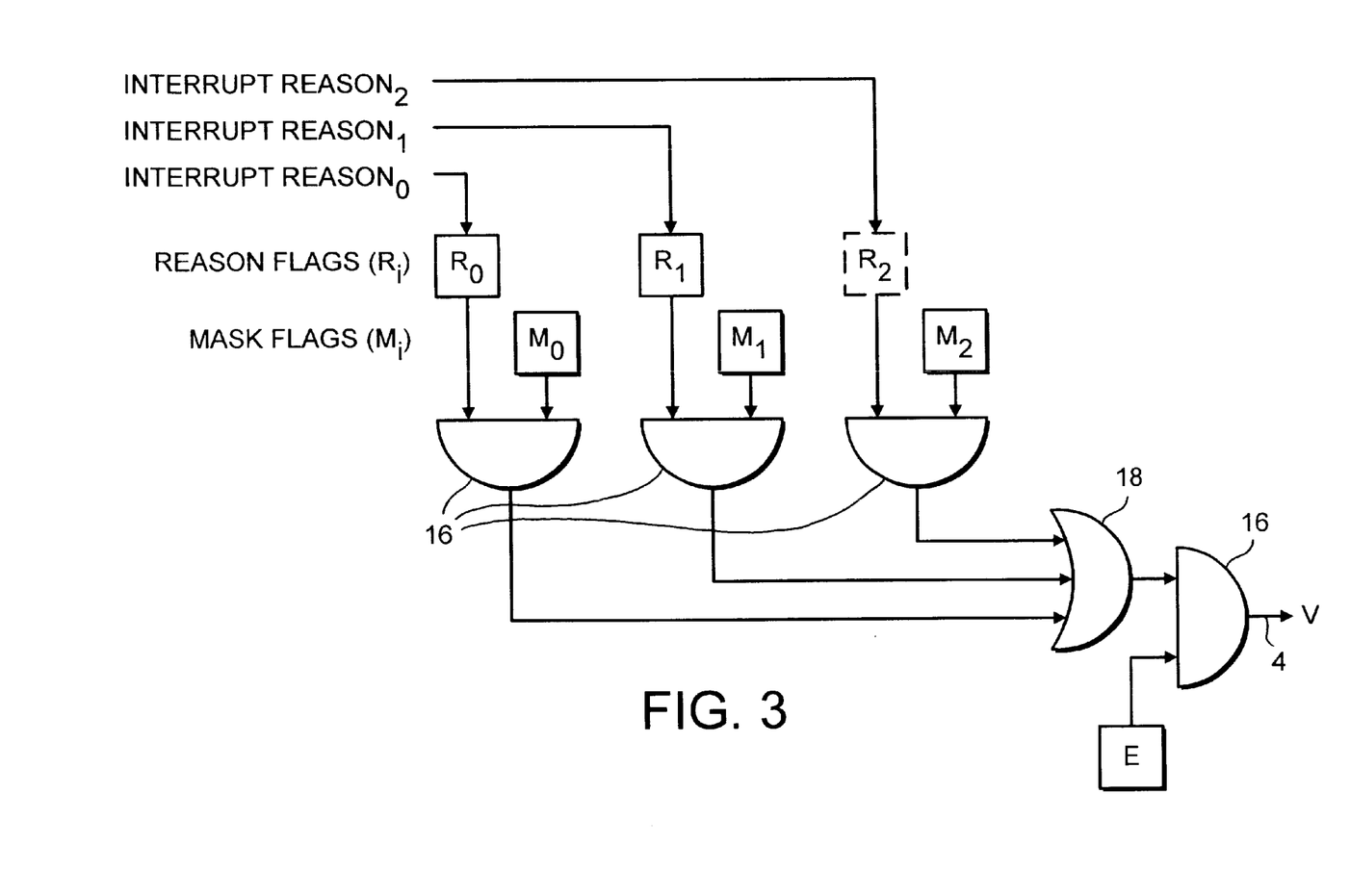
FIG. 3 is a logical diagram of an interrupt source for a peripheral device.

A peripheral device may cause an interrupt on a CPU (i.e. generate an event targeted at a CPU) due to one of a number of reasons. An interrupt source is associated with the following:

An enable flag E that allows interrupts from that source, regardless of the reason, to be enabled or disabled.

Each reason is associated with the following:

A one bit mask flag $M_i$ that controls whether the value of that reason contributes to the interrupt value V on wire 4 or whether it is ignored.

A one bit reason flag $R_i$ that indicates the value of that reason. This flag will be read-only if the reason is derived using combinational logic from the state of the peripheral device 2. This flag will be read-write if the reason is latched. A mechanism is provided to allow software to clear the reason flag.

The above flags are combined together in a standard way to form the interrupt value V. If a peripheral device has r distinct interrupt reasons:

$$\text{Value} = \text{Enable} \ \& \ (\text{OR}_{i \ in \ [0,r)}(\text{Reason}_i \ \& \ \text{Mask}_i))$$

$\text{OR}_{i \ in \ [0,r)} f(i)$ represents the boolean-or of all values of f(i), where i is in the range [0,r), and "&" represents the dyadic boolean-and operation.

A pictorial representation of this arrangement is given in FIG. 3 for a peripheral device which has one combinatorial reason (reason 2) and two latched reasons (reason 0 and reason 1). In FIG. 3, a solid square represents a flag driven from a latch, and a dashed square represents a flag driven from combinatorial logic. Reference numeral 16 denotes AND gates and reference numeral 18 an OR gate.

The representation of FIG. 3 is an exemplary arrangement. Concrete details of the various flags vary for each interrupt source and are designed appropriately.

Two different types of interrupt are discussed herein: level-sensitive and edge-triggered. A peripheral device which is configured as a level-sensitive interrupt will generate an event packet when (referring to FIG. 3) there is:

a detected change in the interrupt value V from 0 to 1—this generates a level-on event;

a detected change in the interrupt value from 1 to 0—this generates a level-off event.

The sampler 6, in the form of a transition detector, samples the continuous interrupt values in order to detect these changes. Normally a sample is taken on each clock cycle. In some practical embodiments of this invention samples may be taken less frequently than this.

After a transition has been detected it takes an implementation defined number of cycles before a subsequent transition can be detected. This delay allows an event packet EP to be generated for that transition. Such a delay causes consecutive samples to be separated by more than one clock cycle.

The transition detector detects a transition between the current sample and the previous sample. As described in the previous paragraph, these samples are not necessarily taken on consecutive clock cycles. Initially the previous sample is 0 since the initial value of the interrupt is off. This arrangement ensures that the transition detector will alternate between level-on events and level-off events, starting with a level-on.

The sampling algorithm used to turn interrupt values into events can cause interrupt level transitions to be lost. If there are zero or one transitions between sample points, then no transitions are lost. However, if there are two or more transitions between sample points, then an even number of transitions are treated as zero transitions and an odd number of transitions are treated as one transition.

The effect is that pairs of adjacent transitions are lost if they occur between sample points. However, the interrupt source guarantees that it will alternate between level-on and level-off events, and that the interrupt level is consistent with the interrupt value at sample points.

Figure 4:
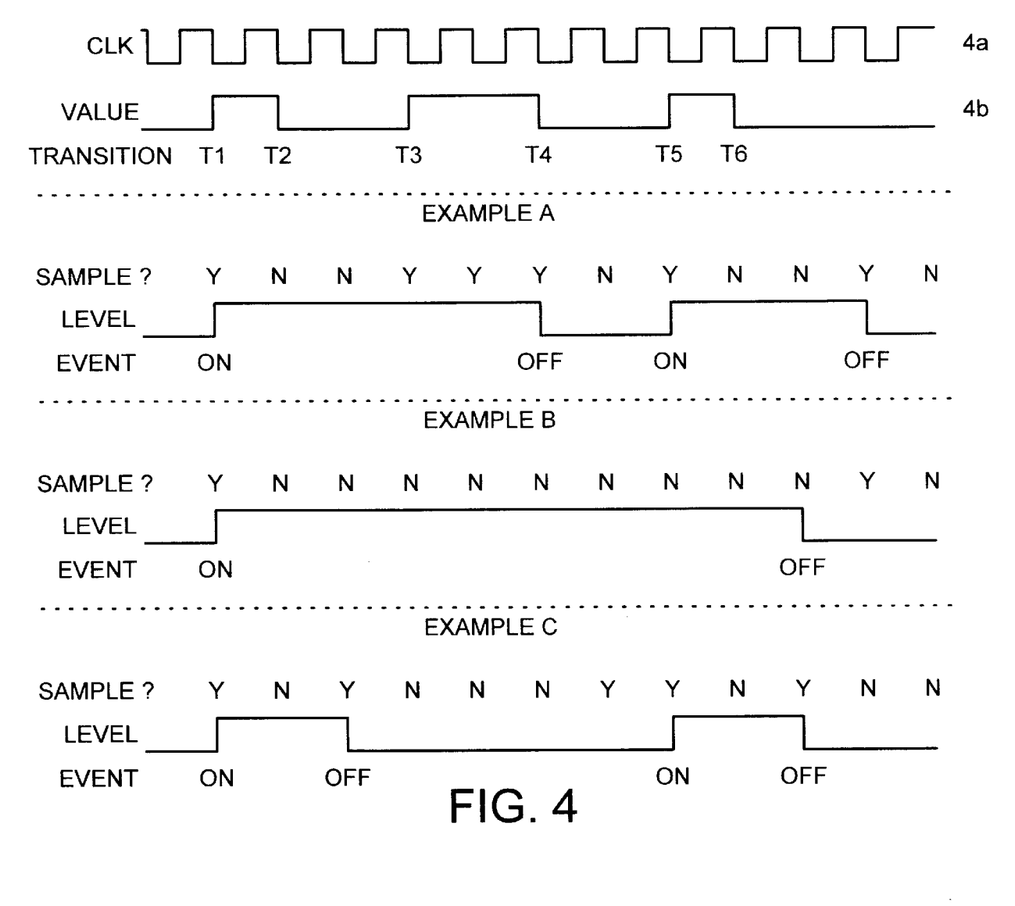
FIG. 4 illustrates the sampling timing for the generation of level sensitive events.

The behaviour is illustrated in FIG. 4. The top two waves in this FIG., 4a and 4b, show the clock and an example interrupt value on wire 4. The subsequent examples A, B and C show, depending on where the sample points are taken, the produced interrupt level and the generated level events for the example interrupt value.

In example A, the transition T1 is detected, the transition pair T2/T3 is lost, T4 and T5 are detected, and T6 is delayed.

In example B, T1 is detected, the pairs T2/T3 and T4,T5 are lost and T6 is delayed.

In example C, T1 is detected, T2 is delayed, the pair T3/T4 are lost, T5 is detected and T6 is delayed.

Transitions are lost only (and then always in pairs) if the interrupt value changes multiple times between sample points. This can be avoided with properly designed level-sensitive interrupt sources.

For edge-triggered events the interrupt value is sampled in exactly the same way as for a level-sensitive interrupt source. The particular transitions which are turned into edge events depend upon the precise details of the peripheral device concerned. A peripheral device might detect 0 to 1 transitions or 1 to 0 transitions or both kinds of transition. Detected transitions cause an edge event to be generated; this edge event does not indicate the direction of the transition.

There may be clock periods where samples are not taken: after a transition has been detected it will take an implementation defined number of cycles before a subsequent transition can be detected.

The sampling algorithm used to turn interrupt values into events can cause edge transitions to be lost. If there are zero or one transitions between sample points, then no transitions are lost. However, if there are two or more transitions between sample points, then an even number of transitions are treated as zero transitions and an odd number of transitions are treated as one transition. The effect is that pairs of adjacent transitions are lost of they occur between sample points.

Figure 5:
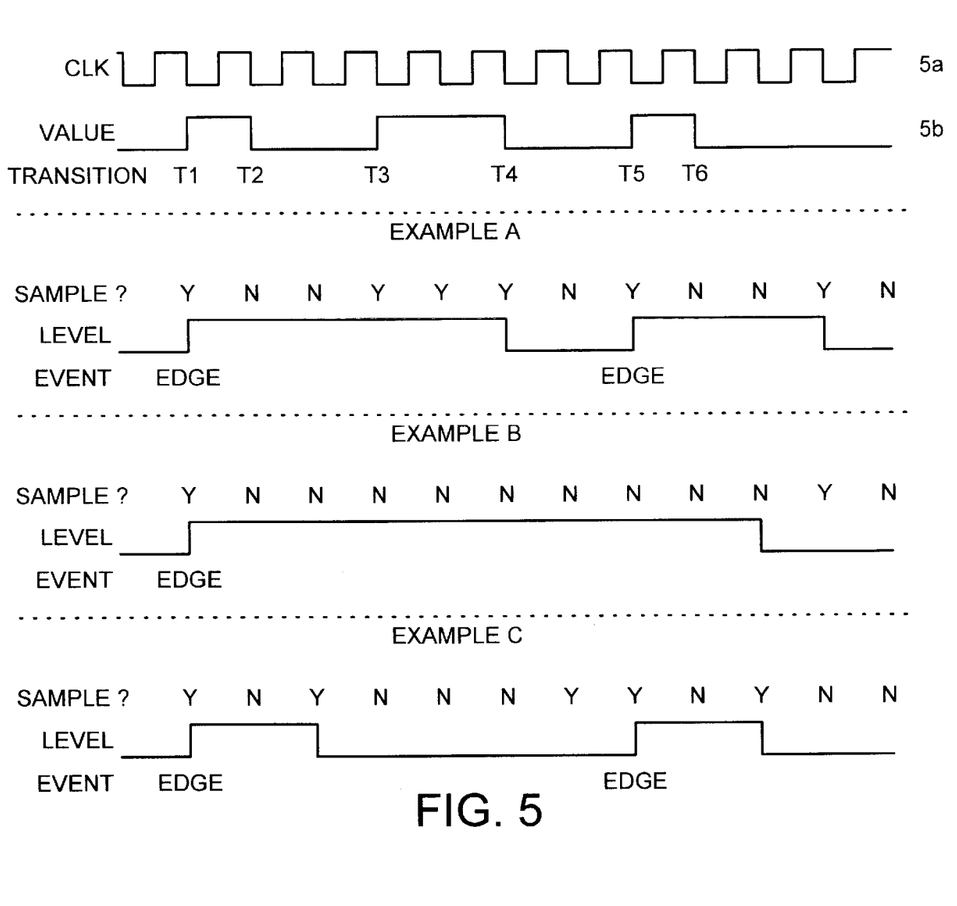
FIG. 5 illustrates the sampling timing for the generation of edge sensitive events.

This behaviour is illustrated in FIG. 5. The top two waves in this FIGS., 5a, 5b, show the clock and an example interrupt value V on wire 4. The subsequent example A, B and C show, depending on where the sample points are taken, the produced interrupt level and the generated edge events for the example interrupt value.

In example A, the transition T1 is detected, the transition pair T2/T3 is lost, T4 is ignored, T5 is detected, and T6 is ignored.

In example B, T1 is detected, the pairs T2/T3 and T4/T5 are lost, and T6 is ignored.

In example C, T1 is detected, T2 is ignored, the pair T3/T4 are lost, T5 is detected, and T6 is ignored.

Transitions are lost only if the interrupt value changes multiple times between sample points. This can be avoided with properly designed edge-triggered interrupt sources.

Figure 6:
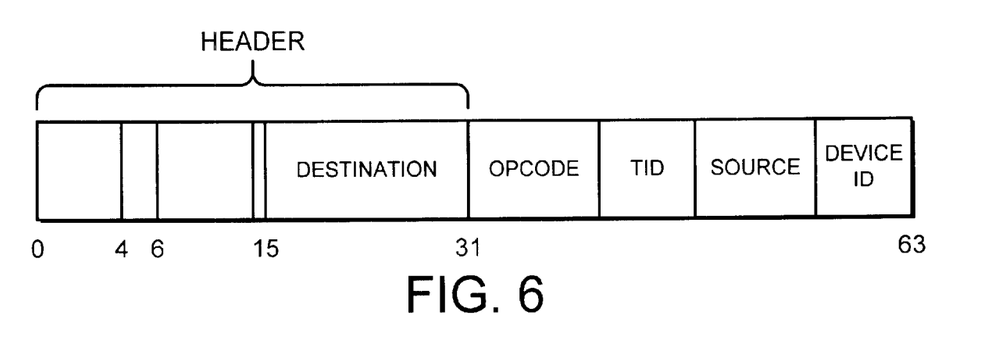
FIG. 6 is a diagram of an event packet.

An event packet is generated by the event assembler 8, the packet having the format shown in FIG. 6. The packet is eight bytes long and comprises a header portion having a length of four bytes and denoted HEADER in FIG. 6, and opcode portion one byte in length, a transaction identifier (TID) one byte in length, a source identifier, one byte in length and a device identifier one byte in length. The source and device identifier portions do not have to be distinct and are intended to identify the originator of the event. The device identifier denotes the identity of the peripheral device generating the event packet, and the source portion can be used to denote the source of the interrupt within that peripheral device. The transaction identifier (TID) can be used in a situation where a sequence of packets may be generated in respect of different interrupts, in which case the transaction identifier TID would be incremented by one (by a counter) each time. Where desired, this can be used in a system where response packets are generated and received by the peripheral devices. In that case, the response packet would contain the same transaction identifier as that generated in the event packet. In a simpler implementation however, the transaction identifier can always be set to zero.

The opcode byte identifies the packet as an event packet and is the same for all events. This allows the receiving CPU to treat the packet as an event packet. For the purposes of the present disclosure, other packet types are not discussed, but it will be appreciated that the present invention can be used in the context of other packets conveying messages other than interrupt messages.

The header portion of the packet HEADER includes the fields identified in Table II below. Thus, it includes a priority indicator which indicates the priority level of the event at bits 0–4, identification of the type of event at bits 5–6 and the destination of the packet. In the present implementation, that destination is always defined as the on-chip CPU which in the present implementation is the only module capable of handling event packets.

TABLE II

| Name | Bits | Function |
| --- | --- | --- |
| EN.PRIORITY | 0–4 | Priority level of event. |
| EN.TYPE | 5–6 | 0 Edge event |
|  |  | 1 Level-on event |
|  |  | 2 Reserved |
|  |  | 3 Level-off event |
|  | 7–14 | Set to zero for normal events. |
| EN.SPECIAL | 15 | Whether the event is a special or soft-reset event. Set to zero for normal events as discussed herein. |
| EN.ADDR | 16–31 | Destination CPU/Device source address. |

Figure 7:
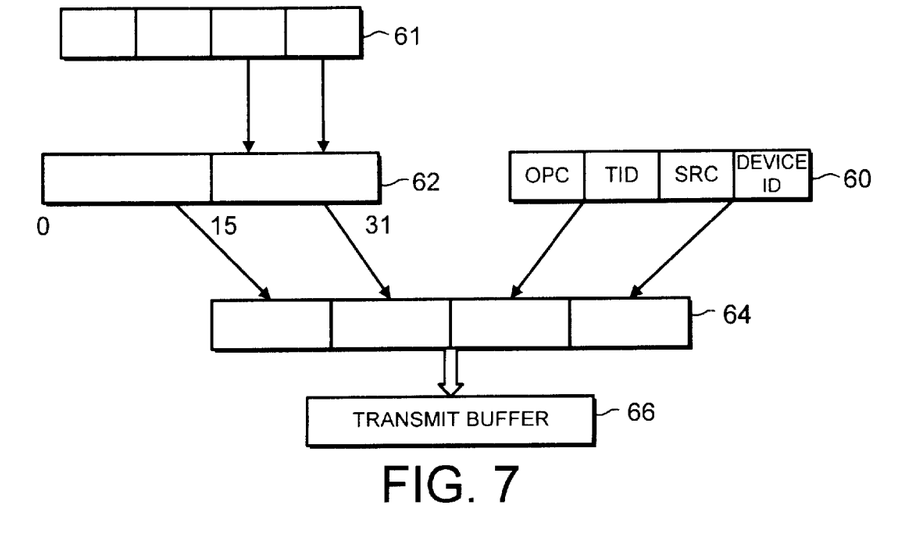
FIG. 7 is a schematic diagram of a packet assembler.

The event assembler is illustrated in FIG. 7. The event assembler comprises a transaction register 60, and a 32 bit header register 62, and a 32 bit address register 61. The address register 61 holds a four byte address which predefines the address to which event packets from that peripheral device will be dispatched. The top two bytes of that address are loaded into the header register 62 when a packet is to be assembled. Bit positions 0–15 of the header register 62 have already been set with priority indicators and event types which relate to that peripheral device. Thus, these are predetermined for each peripheral device. Although it will be clear from the preceding description of Table I that the types of events can be programmed, once programmed the event types are set in the header register 62. The transaction register 60 holds the remaining four bytes of the packet as described earlier. When an event packet is to be transmitted, the complete packet is assembled in a packet buffer 64.

To launch the packet, it is transferred to a transmit buffer 66 from where it is transferred onto the routing path 10 which transmits the packet to the CPU 14.

Figure 8:
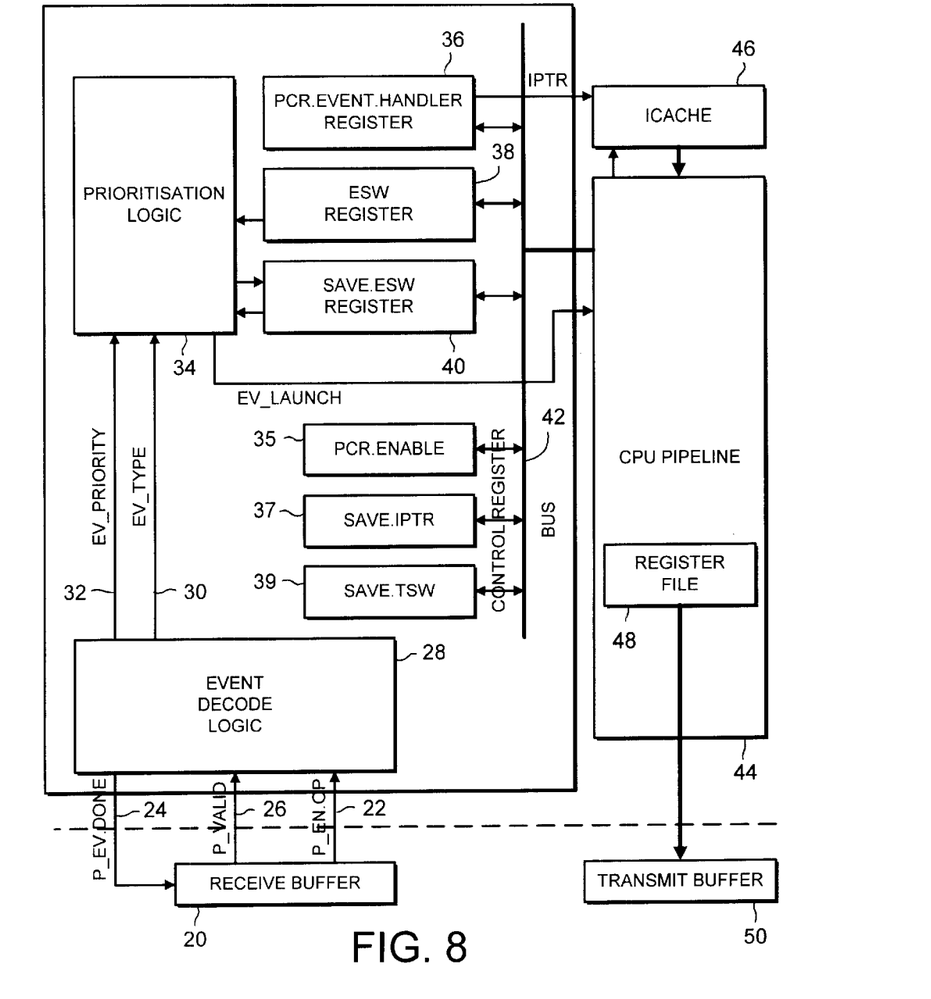
FIG. 8 is a block diagram of an event handling mechanism.

FIG. 8 illustrates a schematic diagram of the event handler 15 which is provided at the CPU 14 for receiving event packets. A receive buffer 20 is connected to the routing path 10 to receive event packets. A signal p-en.op on line 22 is asserted from the OPCODE field to identify the packet as an event and a signal p-valid on line 26 signals that a valid packet is received in the buffer.

A signal p-ev.done on line 24 is asserted when a packet is removed from the receive buffer.

Event decode logic 28 asserts an event-type signal EV-TYPE on line 30 and an event priority signal EV-PRIORITY on line 32 to prioritisation logic 34. The event handler includes a number of control registers, including the following:

PCR.event.handler register 36;
ESW register 38;
SAVE.ESW register 40;
PCR.ENABLE register 35;
SAVE.IPTR register 37;
SAVE.TSW register 39.

These registers are connected via a control register bus 42 to a CPU pipeline 44. The PCR.event.handler register 36 generates an instruction pointer IPTR to an instruction cache 46 which supplies instructions for execution by the CPU pipeline 44. Reference numeral 48 denotes a register file forming part of the CPU 14. Reference numeral 50 denotes a transmit buffer which holds packets assembled by the CPU pipeline 44 for transmission on the routing path 10.

The prioritisation logic 34 will not be described in detail herein. It controls the order in which event packets are acted on by the CPU by determining on receipt of an event packet whether and when it will be accepted for handling. The following description assumes that an event packet which has been received by the event handler will be accepted for handling.

Two of the control registers 38,40 hold event information, as follows:

ESW Event Status Word. This defines the event state of the CPU.

SAVE.ESW Previous Event Status Word. This contains the previous event state of the CPU, and the source of the event, for use by event handlers.

Events are disabled by hardware on event acceptance. The format of the ESW and SAVE.ESW registers 38, 40 is shown in Table III.

TABLE III

| Name | Bits | Valid in ESW | Valid in SAVE ESW | Function |
| --- | --- | --- | --- | --- |
| ESW.DEVICE | 0–7 | | ✓ | Interrupting device number from DEVICE ID field. |
| ESW.SHARED-LEVEL | 8 | | ✓ | More than one level event has been asserted concurrently since last event launch. |
| | 9–24 | | | Reserved (set to zero). |

TABLE III-continued

| Name | Bits | Valid in ESW | Valid in SAVE ESW | Function |
| --- | --- | --- | --- | --- |
| ESW.OVERRUN | 25 | | ✓ | More than one edge event has occurred since last event launch OR too many level events have been asserted. |
| ESW.PRIORITY | 26–30 | ✓ | ✓ | Priority level. 0 indicates the highest priority and 31 the lowest. |
| | 31–63 | | | Reserved (set to zero). |

The field ESW.PRIORITY holds the existing priority state of the CPU. When an event is accepted by the CPU 14, the content of the ESW register 38 is copied to the SAVE.ESW register 40 as defined in Table III, including the CPU priority. This allows the CPU priority to be recovered when the event has been handled. The reserved fields in the ESW are copied to the SAVE.ESW register on event acceptance, in order to provide forward compatibility. The CPU priority is set to that of the accepted event, by setting the ESW.P-RIORITY bits. The PCR.ENABLE control register 35 is then cleared, disabling acceptance of another event.

When an event is accepted, the CPU 14 will be in train of executing an existing instruction thread. This will be interrupted to allow the event to be handled and so is referred to herein as the interrupted thread. Each thread is associated with an instruction pointer IPTR and thread status word TSW. The IPTR and TSW of the interrupted thread d are copied to the SAVE.IPTR and SAVE.TSW control registers 37, 39 respectively. The SAVE.IPTR points to the next unexecuted instruction of the interrupted thread and the SAVE.TSW value is consistent with this.

Then a so-called event handler is launched. An event handler is launched by the CPU commencing an interrupt service routine which is a sequence of instruction s for dealing with the e interrupt conveyed by the event packet. The correct interrupt service routine is identified from a table held in the CPU memory by the DEVICE ID and priority indicator bits of the event packet. This information is supplied along the EV-TYPE line 30.

The event handler inherits the contents of any necessary registers from the interrupted thread. Also the contents of those registers which should not be destroyed by the event handler must be saved.

The first instruction in the event handler sequence initialises the IPTR to the event handler entry point when an event is accepted.

The PCR.EVENT.HANDLER control register holds the entry point to the event handler when interrupting a kernel mode thread.

The event handler entry point for interrupting user mode threads is derived from the kernel mode entry point by clearing the least significant 8 bits. In this way, event handlers interrupting user threads must be aligned to 256 byte boundaries. The event handler for kernel threads can be up to 254 bytes after this. Often, event handler code can make some assumptions, should it be determined that the event interrupted a kernel mode thread. This mechanism provides a way for events interrupting user mode threads to cause some additional initialisation to occur. Should this separation not be required, the bottom eight bits of the control register should be set to zero, to force all event handlers to go to the same location.

The format of the PCR.EVENT.HANDLER control register is shown in Table IV.

TABLE IV

| Bits | Value |
|---|---|
| 0 | Ignored, as instructions are always 2-byte aligned. |
| 1–7 | Offset for interrupting kernel mode threads. |
| 8–31 | Upper 24 bits of event handler entry point. User mode events have zero as the lower eight bits, and kernel mode events use the specified offset. |
| 32–63 | Reserved (set to zero). |

The event handler can return control to the interrupted thread with a restart instruction. Exit code at the end of the event handler instruction sequence restores the values of the SAVE.IPTR and SAVE.TSW registers 37, 39 so that the interrupted thread can recommence.

The event handler sequence also restores the ESW register 38 to what it was before the event handler was launched. This can be done by storing the value which was in the SAVE.ESW register 40 at event handler launch.

In addition, any registers of the interrupted thread used by the event handler must be restored to their original state. If trap handlers can be interrupted before the trapped instruction state has been retrieved, then event handlers must also save and restore this state.

The possibility exists that event packets may arrive at the CPU at a faster rate than the processor is able to process them. In such a situation it is generally not possible to buffer up details of interrupts until the CPU can clear them. It is important however, to inform event handlers when there have been events raised whose details could not be stored. The ESW.SHAREDLEVEL and ESW.OVERRUN flags of the ESW register 38 (see Table II) provide facilities for this. Using these flags, the event handler software is always aware of when a single event handler launch is caused by:
  i) more than one level-on event;
  ii) too many level-on events;
  iii) two or more edge-triggered events.

The CPU 14 also generates response packets when an event packet is received. These response packets are returned to the peripheral device which generated the event packet. If transaction identifiers are used, the response packet contains the same TID number as that in the corresponding event packet. The generation and handling of response packets. is not described further herein.

What is claimed is:

1. A method of transmitting an interrupt represented by an electrical level of a conductor from a peripheral device to a receiving module by:
  detecting the electrical level of the conductor;
  constructing a message packet to transmit the interrupt when it is detected that the electrical level has changed between a logical zero level and a logical one level the message packet including identification of the peripheral device which generated the interrupt;
  transmitting the message packet from the peripheral device to the receiving module; and
  at the receiving module, handling the message packet to act on the interrupt by implementing an interrupt handling routine dependent on the identity of the peripheral device which transmitted the message packet;
  wherein the message packet contains a transaction identifier which uniquely identifies one of a series of interrupts, and wherein the receiving module generates a response packet containing the same transaction identifier.

2. A method according to claim 1, wherein the receiving module comprises a processor.

3. A method according to claim 1, wherein the message packet includes an event type which denotes the nature of the interrupt conveyed by the message packet.

4. A method according to claim 3, wherein the event type is a level-on event denoting a change from said logical zero level to said logical one level.

5. A method according to claim 3, wherein the event type is a level-off event denoting a change from said logical one level to said logical zero level.

6. A method according to claim 3, wherein the event type is an edge event denoting a transition between said logical zero level and said logical one level.

7. A method according to claim 2, wherein, when the processor is already executing an instruction thread when the message packet is received from the peripheral device, the instruction thread is interrupted to allow the message packet to be handled.

8. A method according to claim 1, when used in a computer system comprising a plurality of receiving modules, wherein the message packet includes a destination address identifying the receiving module to which the message packet is transmitted.

9. A computer system comprising a plurality of peripheral devices and a processor in communication with the plurality of peripheral devices via a routing path, wherein each peripheral device is associated with circuitry for detecting an electrical level of a conductor representing an interrupt and a packet assembler for constructing a message packet when it is detected that the electrical level of the conductor has changed between a logical zero level and a logical one level, an identity of a respective peripheral device being conveyed by the message packet constructed by the packet assembler associated with the respective peripheral device, wherein the message packet is transmitted from the respective peripheral device to the processor via the routing path, and wherein the processor includes a packet handler for handling the message packet to act on the interrupt by implementing an interrupt handling routine in dependence on the identity of the respective peripheral device;
  wherein the message packet contains a transaction identifier which uniquely identifies one of a series of interrupts, and wherein the packet handler generates a response packet containing the same transaction identifier.

10. A computer system according to claim 9, wherein the processor comprises an execution unit for executing an instruction thread, and means for holding state information about the instruction thread which is being executed, whereby when the packet handler acts on the interrupt conveyed by the message packet, the instruction thread is interrupted and said state information about the instruction thread is stored for later resumption of the instruction thread.

11. A computer system according to claim 9, wherein the packet assembler is operable to assemble a plurality of different packet types denoting different events relating to changes in the electrical level.

12. A computer system according to claim 9, wherein the respective peripheral device comprises an interrupt source which has combinatorial logic for generating the interrupt in response to a plurality of different interrupt reasons of the respective peripheral device.

13. A method of transmitting a series of interrupts represented by electrical levels of a conductor from a peripheral device to a receiving module by:
  for each interrupt detecting the electrical level of the conductor;

constructing a message packet to transmit an interrupt when it is detected that the electrical level has changed between a logical zero level and a logical one level, said message packet including a transaction identifier which uniquely identifies that interrupt;

transmitting the message packet from the peripheral device to the receiving module; and at the receiving module, handling the message packet to act on the interrupt by implementing an interrupt handling routine and generating a response packet which includes the transaction identifier for that interrupt.

14. A computer system comprising at least one peripheral device and a processor in communication with the peripheral device via a routing path, wherein the peripheral is associated with circuitry for detecting the electrical level of a conductor representing an interrupt and a packet assembler for constructing a message packet when it is detected that the electrical level of the conductor has changed between a logical zero level and a logical one level, the packet assembler being capable of inserting a transaction identifier into the message packet to uniquely identify one of a series of interrupts generated by the peripheral device, wherein the message packet is transmitted from the peripheral device to the processor via the routing path and wherein the processor includes a packet handler for handling the message packet to act on the interrupt by implementing an interrupt handling routine and for returning a response packet to the peripheral device containing the same transaction identifier uniquely identifing that interrupt.

* * * * *